Nov. 20, 1934.    D. H. MURPHY    1,981,742
ELECTRIC WIRING SYSTEM
Filed Jan. 18, 1934
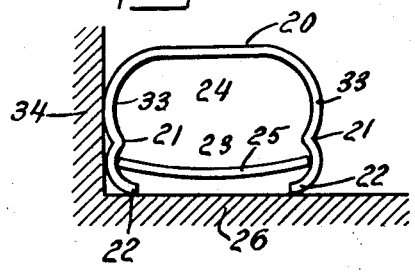
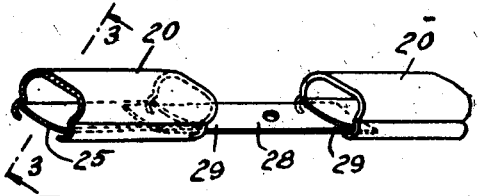
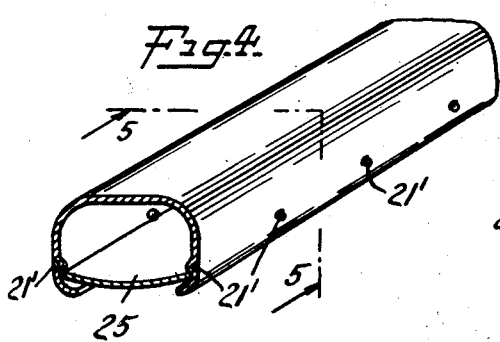
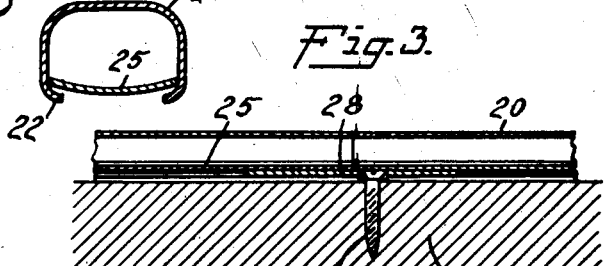
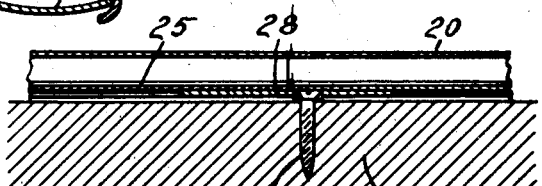
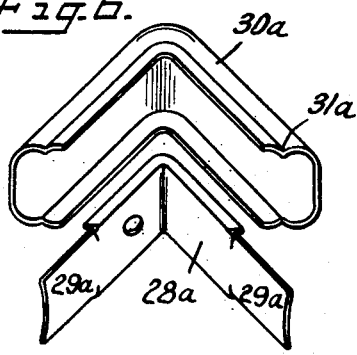
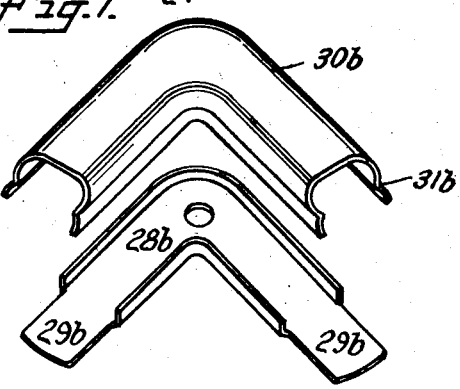
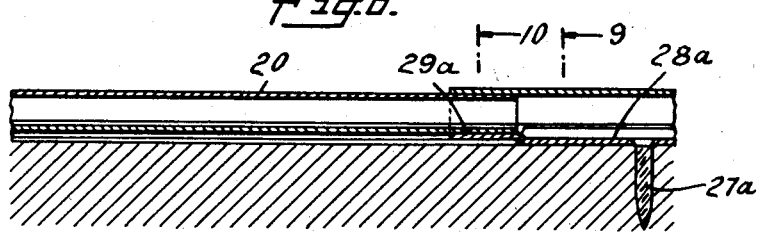
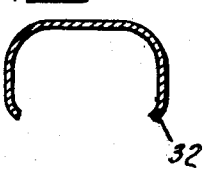
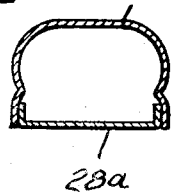
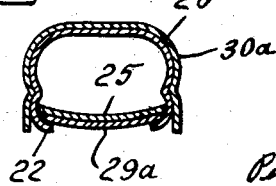
INVENTOR
Daniel Hayes Murphy
BY
Pennie, Davis, Marvin and Edmonds
ATTORNEYS Patented Nov. 20, 1934

1,981,742

UNITED STATES PATENT OFFICE 1,981,742

ELECTRIC WIRING SYSTEM

Daniel Hayes Murphy, West Hartford, Conn., assignor to The Wiremold Company

Application January 18, 1934, Serial No. 707,090

1 Claim. (Cl. 247—37)

My invention relates to electric wiring systems and conduit members for use therein and particularly that class of wiring systems which is used for interior wiring on the surface of walls and ceilings.

In the accompanying drawing Fig. 1 is an end view of a conduit comprising a housing member and a base member; Fig. 2 shows the ends of two such sections of such conduits partially assembled; Fig. 3 is a section on the line 3—3 of Fig. 2 showing the ends of the two conduit sections completely assembled; Fig. 4 shows a modified form of housing member; Fig. 5 is a cross section on the line 5—5 of Fig. 4; Figs. 6 and 7 show elbows for use in the system; Fig. 8 is a longitudinal section of the conduit, assembled with an elbow of the type shown in either Fig. 6 or Fig. 7; Fig. 9 is a cross section on the line 9—9 of Fig. 8; Fig. 10 is a cross section on the line 10—10 of Fig. 8; and Fig. 11 is an end view of a modified form of an elbow cover suitable for use with the modified form of housing member shown in Figs. 4 and 5.

The sides of the walls of the generally U-shaped housing member 20 of Fig. 1 are provided with inwardly extending projections or grooves at the two laterally opposite points 21, 21, and with lips 22, 22. It will be noted that the projections 21, 21 in cooperation with the lips 22, 22 define or indicate a division of the interior of the U-shaped housing member into two channels; a shallower channel 23 adjacent to the open side of the U and the deeper channel 24. The sides of the shallower channel form beaded base-engaging members adapted to engage and hold a base member or closure strip 25 shown in place in Figs. 1, 2 and 3, which strip is preferably curved downwardly as shown in Fig. 1, but is relatively flat as compared with the U-shaped housing member. The deeper channel 24 and that portion of the shallower channel 23 above the closure strip 25 form a space adapted to receive, hold and protect electric wires.

This conduit is installed by fastening to the wall 26 (Fig. 3) or other surface, by means of the screw 27, metal strips 28 shown in Figs. 2 and 3. Each of these strips when so fastened presents two projecting tongues 29, 29. The conduits are then slipped in place as shown in Figs. 2 and 3 so that the tongues 29 underlie the closure strip 25 in the narrower channels 23 of the housing members and are held in operative relation to the housing members, as is also the closure strip, by the curved formed between the projections 21 and the lip 22.

In this manner it is possible to provide a simple and inexpensive conduit which is rapidly and simply attached to the walls or ceilings, being held in place by the strips 28 and the screws 27.

In the modified form shown in Fig. 4 the two continuous inwardly extending projections 21, 21 of Fig. 1 are replaced by two series of short inwardly extending projections 21', 21', 21', forming short beaded base-engaging portions which serve the purposes served by the projections 21 of Fig. 1.

Fig. 5 shows a cross section of the modified form of conduit taken substantially along the line 5—5 of Fig. 4, between two adjacent projections 21'. It will be noted that between two such adjacent projections, the side walls of the U-shaped member are not characterized by any indentation.

Where it is necessary to carry the conduit around a corner I use a special corner member or elbow; two such elbows are shown in Figs. 6 and 7.

The elbow of Fig. 6 is of the exterior type. In installing this elbow the supporting strip 28a is fastened to the wall by a screw so as to rest against a projecting corner of the wall. The tongues 29a, 29a, which are slightly offset upwardly where they join the supporting strip, perform the functions of the tongues 29 of Fig. 3; that is to say the housing members 20 may be slipped endwise upon them as shown in Fig. 8, just as they can be slipped endwise on the tongues 29 of Fig. 2.

Similarly where it is desired to turn the conduit at a right angle in the plane of the wall I use the right angle elbow shown in Fig. 7 with its corresponding supporting strip 28b, presenting corresponding tongues 29b.

I do not describe or illustrate the junction boxes, switch boxes or plug receptacle boxes, as they are similar to those shown in the Rutherford Patent 1,917,958, July 11, 1933.

The conduit thus being installed in place, supported at its joints by the arrangement shown in Figs. 2 and 3 and at the elbows by the arrangements shown in Fig. 8, I then cover the elbows by snapping in place the members 30a of Fig. 6 or 30b of Fig. 7 as the case may be, which present grooves 31a, 31b, which slip over and then engage with the grooves 21 of the form of conduit shown in Fig. 1 and which are shown as being so shaped that their lower edges come flush with the wall or other surface on which the conduit is fastened so as to leave no crack or space for the accumulation of dust or as a breeding place for insects (Figs. 9 and 10).

Where the form of conduit member shown in Fig. 4 is employed I omit the grooves 31a or 31b of the covers and slightly curve the lower portion of the covers as at 32 so as to embrace the outer edges of the curved lips 22. This construction is shown in section in Fig. 11.

Referring now again to Fig. 1, it will be seen that above the projection 21 the side walls of the housing member bulge outwardly at 33, 33, so as to make the width of the main electrical conductor-enclosing portion substantially equal to the width of the shallower channel which contains the base member or closure member 25. In other words the opposite side walls of the main electrical conductor-enclosing portion, at its point of greatest width, are disposed in planes substantially parallel to each other and substantially normal to the transverse axis of the base member, and are spaced apart so that the distance between them will be substantially the same as the distance between the opposite side walls of the shallower channel or beaded base-engaging portion at its point of greatest width. This construction, as well as the similar construction shown in Fig. 4, has the advantage of considerably increasing the space available in the conduit for the wires with any given width of channel member, as distinguished, for example, from a construction in which the side walls of the channel member project upwardly directly from the inner point of the groove, as was the case in certain prior-art devices. These constructions also have the advantage of enabling the conduit to be bent, as is often necessary in practice, more readily than the prior-art member could be bent, and with less danger of injuring it, and the further advantage that when the member is installed against the surface of a side wall, indicated by 34 in Fig. 1, the curved portion 33 can be made to abut directly against the side wall, with the resultant substantial elimination of the space or opening between the conduit and the side wall which formerly existed, in which dirt collected and in which insects multiplied.

I claim as my invention and desire to secure by Letters Patent:

In an electrical conduit comprising a base member and a generally U-shaped housing having beaded base-engaging portions adjacent the outer ends of the legs thereof and a relatively deep main electrical conductor-enclosing portion spaced inwardly from the beaded base-engaging portions; said U-shaped housing member having the opposite side walls of the main electrical conductor-enclosing portion disposed in planes substantially parallel to each other and substantially normal to the principal transverse axis of the base member and spaced apart so that the distance between said side walls is substantially the same as the distance between the outer walls of the beaded portions, whereby substantially the entire space enclosed by the base member and the housing is available for receiving electrical conductors.

DANIEL HAYES MURPHY.